Figure 3:
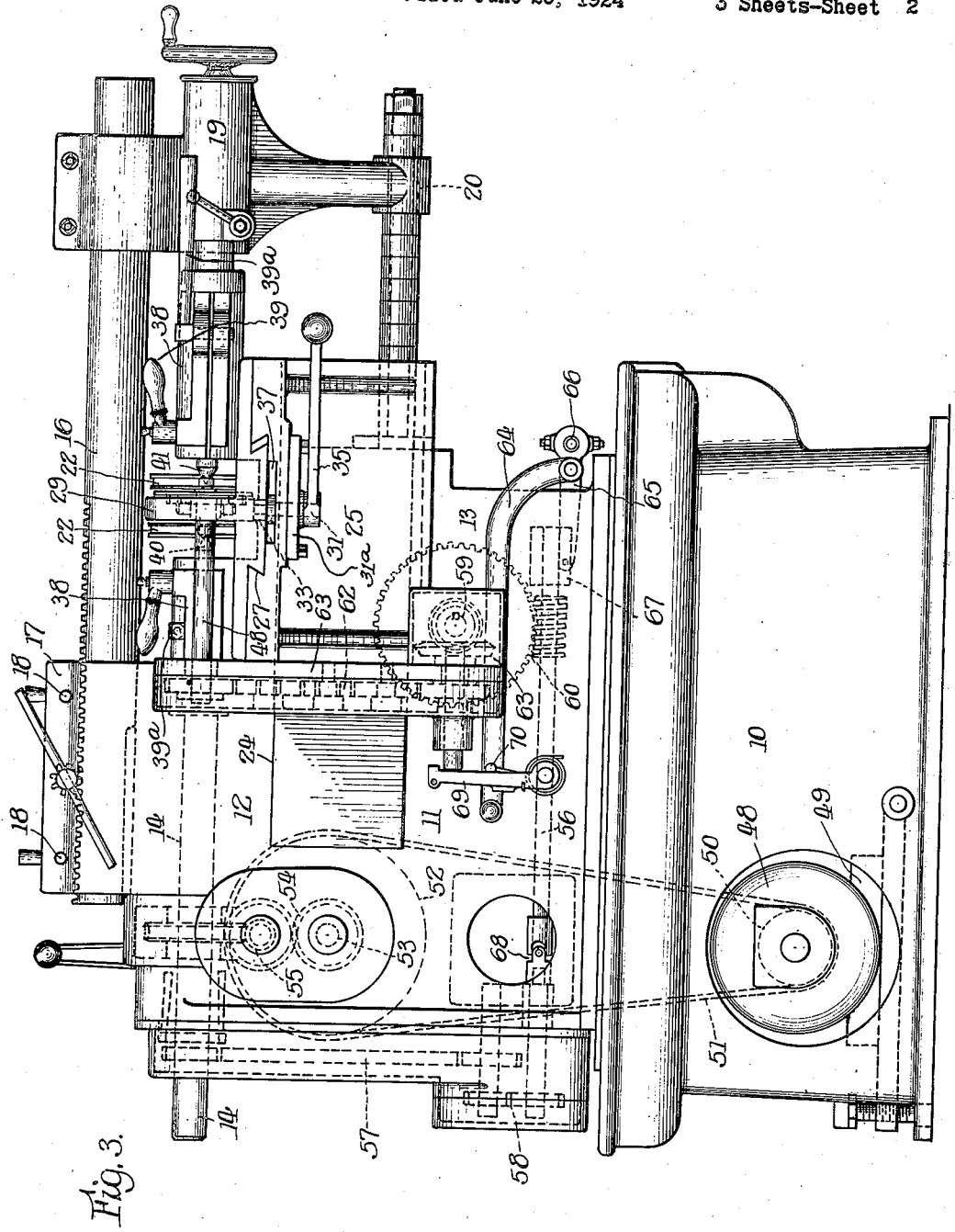

Dec. 4, 1928.  1,694,363
G. D. SUNDSTRAND
MACHINE TOOL
Filed June 25, 1924   3 Sheets-Sheet 1
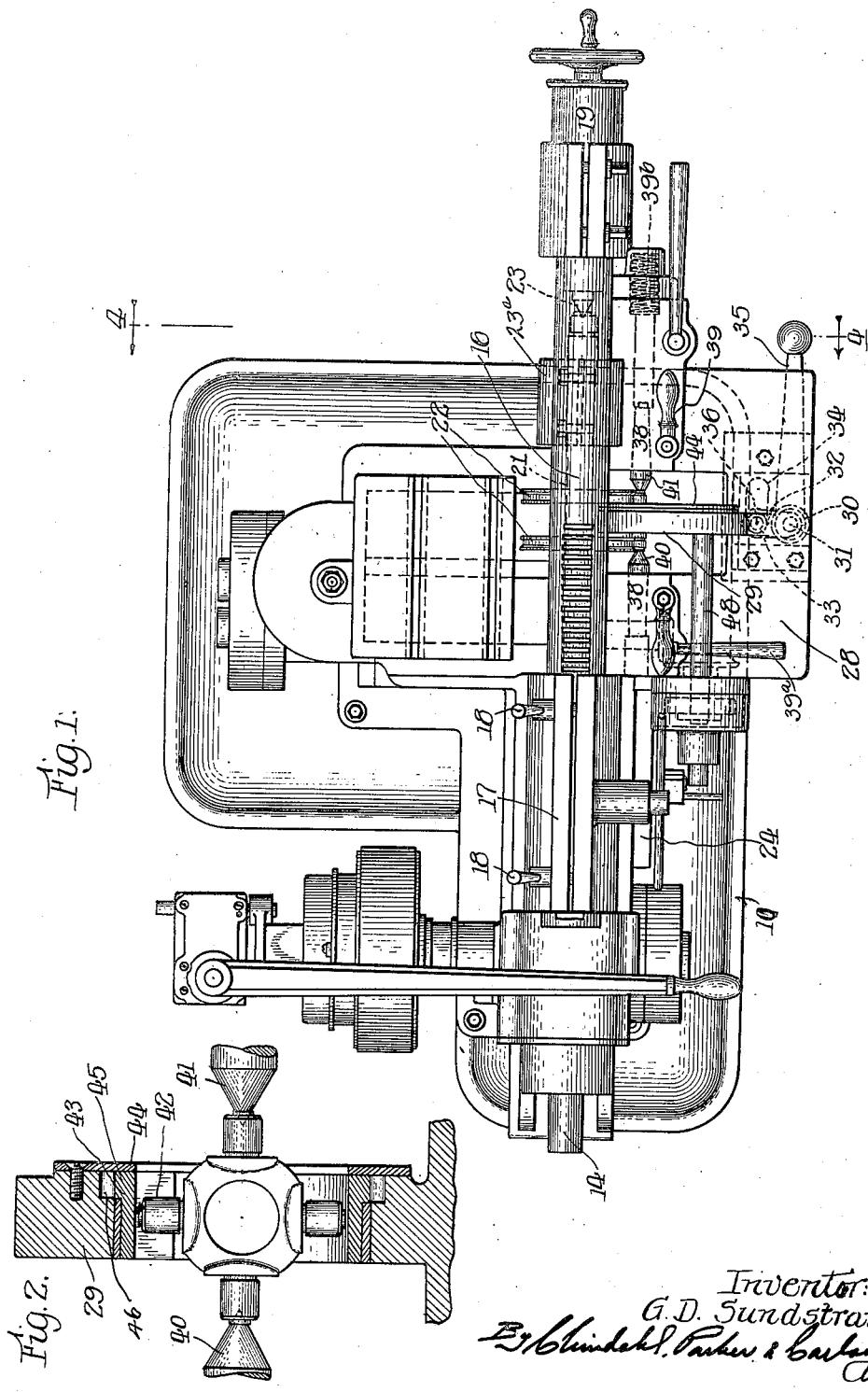
Inventor:
G. D. Sundstrand, Dec. 4, 1928.

G. D. SUNDSTRAND 1,694,363

MACHINE TOOL

Filed June 25, 1924

3 Sheets-Sheet 2

Inventor:
G. D. Sundstrand,
By Chindahl, Parker & Carlson
Attys.

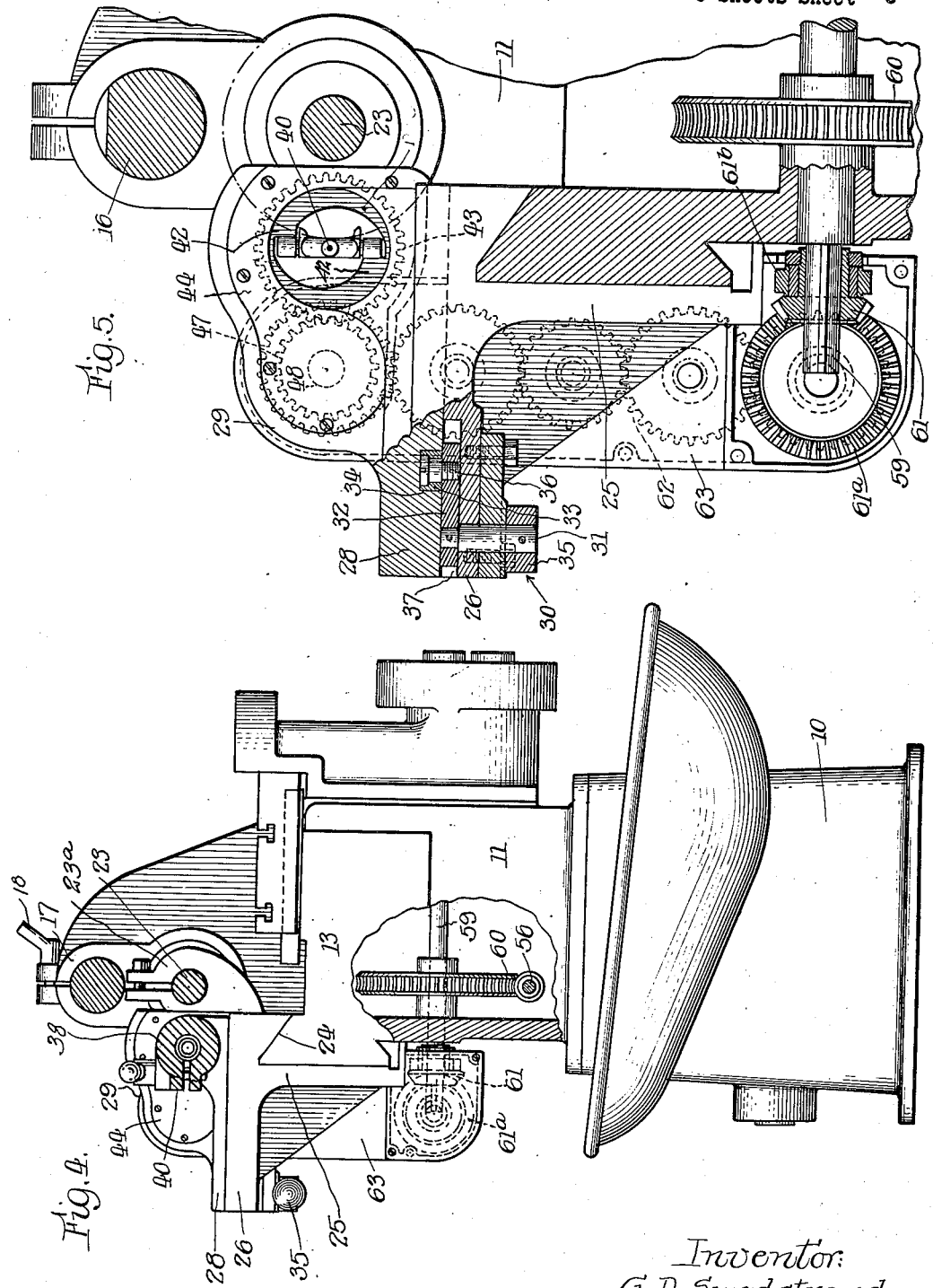

Patented Dec. 4, 1928.

1,694,363

UNITED STATES PATENT OFFICE.

GUSTAF DAVID SUNDSTRAND, OF ROCKFORD, ILLINOIS, ASSIGNOR TO SUNDSTRAND MACHINE TOOL CO., OF ROCKFORD, ILLINOIS, A CORPORATION OF ILLINOIS.

MACHINE TOOL.

Application filed June 25, 1924. Serial No. 722,242.

The invention has especial reference to the manufacture of universal joint crosses, or spiders and similar symmetrical double-ended parts, normally requiring for completion a large number of distinct machining operations. Heretofore the common practice has been to machine such parts in lathes of ordinary construction. In accordance with such practice, the work, having been mounted between centers, is operated upon, first, to turn each of the studs successively; second, to face the shoulder at the inner end of each of the studs; third, to face the extreme outer end of each stud; fourth, to undercut each stud at the shoulder to provide grinding clearance; fifth, to bevel the outer peripheral edge of each shoulder; and finally, to bevel the outer ends of the studs. Because of the separate character of the several operations numerous inspections must be made.

The primary object of my invention is to reduce the cost of manufacturing spiders and similar parts of the character indicated, by performing all of the machining operations in two settings of the work. I attain this result by the use of a pair of formed milling cutters adapted to operate simultaneously upon opposite ends of the work, the whole being mounted for movement into engagement with the cutters and for rotation through one revolution while thus engaged with the cutters. It will be obvious that the chief advantage in this method of machining lies in the great saving of time which results from the simultaneous machining of two ends of the work in one setting thereof, or the complete machining of the work in two settings thereof, as compared to the numerous settings previously required. A further advantage is that the work when operated upon in accordance with the present invention is revolved at a very slow speed, whereas in former methods it must be revolved at a high speed to render it possible to perform the cutting operations. Obviously the rotation of the work at high speed results in substantial wear and tear upon the machine.

A further object of my invention is to provide a milling fixture in the nature of an attachment, which is capable of being rigidly applied to a lathe of the type adapted to support a front tool carriage, the fixture being adapted to be mounted upon the ways normally occupied by the front tool carriage, and the milling cutters being mounted upon an arbor which is made rigid with the lathe spindle.

In the accompanying drawings I have shown a machine tool for carrying out my invention, which embodies a lathe structure of the type shown in my copending application, Serial No. 591,038, filed September 27, 1922, the front tool carriage being replaced by my improved milling fixture. It is contemplated, however, that my invention may be variously embodied in machine tool structures, so that I do not wish to be understood as limiting the invention to the particular construction and arrangement herein illustrated and described.

Figure 1 of the drawings is a plan view of a machine embodying my invention. Fig. 2 is a fragmentary sectional view on an enlarged scale illustrating the work holder. Fig. 3 is a front elevational view of the machine. Fig. 4 is a fragmentary vertical sectional view taken substantially in the plane of line 4—4 of Fig. 1. Fig. 5 is a vertical sectional view through the milling fixture, also on an enlarged scale.

The machine herein shown comprises a base consisting of a lower portion 10 and an upper portion or hollow body 11 of substantial height forming in effect a column 12, to the right of which, Fig. 3, is a laterally extending portion 13, forming in effect a bed. The upper portion of the column provides a headstock in which is mounted the usual spindle 14, and above the spindle I preferably provide a large shaft 16, which extends through the extreme upper end of the column 12 and extends over the bed 13, thus forming an overarm. To support the overarm the column is provided with a split bearing 17 having clamping bolts 18 whereby the overarm may be rigidly held in position.

At the opposite end of the body 11 I provide a tailstock 19 which is so mounted as to constitute a connection between the overarm 16 and the bed. To this end the tailstock is arranged to be adjustably secured at its upper end upon the overarm and at its lower end upon a stud shaft 20 projecting laterally outwardly from the bed. It will be seen that I thus obtain a very sturdy and rugged construction.

Rigidly secured to the spindle 14 is an arbor 21 carrying a pair of formed milling cutters 22 spaced a short distance apart and oppositely disposed so as to be capable of bearing upon opposite ends of a piece of work. The arbor 21, it will be obeserved, has its free end supported by a center 23 carried by the tailstock 19, and preferably also by a bearing 23ª mounted in a manner to be presently described.

Upon the front side of the body 11 there are provided ways 24, and upon these ways I mount a support or fixture 25 having its upper portion constructed to provide a table 26, the upper surface of which is disposed in a horizontal plane above the bed 13. Upon the upper side of said table I provide ways 27 in which is mounted for transverse reciprocation a work supporting slide 28 carrying a housing 29. The said slide is adapted in the present instance to be moved transversely upon the table by manually operable means comprising a bell-crank lever 30 pivoted at 31 in the forward end of the table 26 and in a plate 31ª secured to its underside near its forward end. One arm 32 of said bell-crank carries a roller 33 operating in a longitudinal groove 34 in the under side of the slide. The other arm of said bell-crank is extended somewhat beyond the outer end of the table (Fig. 1) to form a handle 35 for convenience in manipulating the slide. It will be seen from Fig. 5 that the roller 33 is carried upon the upper end of a stud 36 on the free end of the arm 32, and that the upper side of the table is cut away at its forward end, as at 37 so as to render the arm capable of swinging in the operation of the lever 35.

The housing 29 (Fig. 1) is located substantially centrally of the table, and upon opposite sides thereof, near the rear edge of the table, I provide heads 38 of usual construction for centers 40 and 41. Between these centers I support the work, the outer ends of the spider arms being previously provided with the necessary centering depressions. Each of the heads 38 is as usual provided with a screw clamp 39, and one of the heads has means for adjusting its center, which means is of usual construction, being operable by a lever 39ª. The other center is normally urged outward by a spring 39ᵇ.

The work is secured in any well known manner, as by means of dogs 42, within a ring gear 43 (Fig. 2) suitably mounted for rotation in the housing. In the present instance said housing is constructed with an open side closed by an apertured plate 44, and upon the ring 43 is formed an annular toothed rib 45 arranged to fit within an annular recess 46 formed by the housing and the ring 43. Also mounted in the housing 29 forwardly of the ring gear 43 and meshing therewith is a gear 47 which is mounted upon a shaft 48 journaled at its outer end in the housing. It will be seen by the construction which I have provided that the work may be moved into engagement with the rapidly revolving milling cutters, and may revolve while thus engaged to effect the simultaneous finishing of opposite ends of the work during a single revolution of the latter. The bearing 23ª for the milling cutter arbor is carried by the rear end of the table 26 (Figs. 1 and 4).

The means for actuating the milling cutters and revolving the work will now be described:

Herein I have shown an electric motor 48 as the source of motive power, this motor being mounted upon a suitable block 49 within the base 10. The rear end of the motor shaft carries a pulley 50 connected by means of a belt 51 with a pulley wheel 52 mounted upon a shaft 53 extending transversely of the hollow body 11. Said shaft 53 is connected by a gear train 54 and worm gearing 55 with the spindle 14.

In the lower portion of the body 11 there is a longitudinally extending shaft 56 which is driven from the spindle 14 by a chain and sprocket mechanism 57 and change speed gearing 58. Said shaft 56 is arranged to drive a transversely extending shaft 59 at a reduced speed by worm gearing 60 (Figs. 3 and 4). The shaft 59 is extended forwardly through the bed 13 (Fig. 5) and is connected by means of bevel gears 61 and 61ª, and a chain of spur gears 62 with the shafts 48. A suitable housing 63 is provided for the gearing 61—62 which housing is secured at its upper end to the table so as to be movable bodily therewith, and, as shown in Fig. 5, the gear 61 is splined upon the shaft and is mounted in a bearing 61ᵇ for movement with the housing.

The rotation of the work is controlled in the present instance by means of a hand lever 64 (Fig. 3) rigid with an arm 65 which is pivoted at 66 to the body 11. Said arm 65 carries a bearing 67 for the end of the shaft 56, and the latter has a universal joint 68 interposed therein to permit it to drop so as to disengage the worm gearing 60. The hand lever 64 may normally be supported in position to maintain the worm gearing 60 in engagement, as by means of a pivoted spring controlled latch member 69 having a stop shoulder thereon upon which rests a pin 70 on the lever 64.

In the operation of machining a universal joint cross or similar part, the work is first secured between the centers 40, 41 and then moved by the operation of the handle 35 of the bell crank lever 30 into engagement with the formed milling cutters 22, until the desired depth of cut has been obtained. Thereupon the work is set in rotation by the operation of the handle 64, to revolve it through a single revolution in the course of which all of the surfaces first above referred to are milled to the proper size and shape. Thus it will be seen that in two settings of the work it may be entirely machined, with the result that a substantial saving in time is effected as compared with the method heretofore in common use.

I claim as my invention:

1. The combination of a bed and an upright column having a headstock at its upper end with a spindle journalled in the headstock, a feed shaft mounted in the lower end of the column in substantially parallel relation to the spindle, means for driving the spindle, a power transmission connecting the spindle and said feed shaft, a fixture mounted on the forward side of the bed, a slide on said fixture movable toward and from the axis of the spindle, a shaft to be driven mounted on said slide, a second power transmission having one end operatively connected with said shaft to be driven and its other end operatively connected with said feed shaft, and a housing supported from the slide and enclosing said second transmission.

2. The combination of a hollow base having a column at one end, a headstock at the upper end of the column having a spindle journalled therein, a feed shaft mounted in the lower end of the base in substantially parallel relation to the spindle, means for driving the spindle, a power transmission connecting the spindle and said feed shaft, a fixture mounted on the forward side of the base, a slide on said fixture movable toward and from the axis of the spindle, a shaft to be driven mounted on said slide, a second power transmission having one end operatively connected with said shaft to be driven and its other end operatively connected with said feed shaft, and a housing supported from the slide and enclosing said second transmission, the operative connection between the feed shaft and the second transmission including a shaft passing through the forward wall of the base and a gear element splined on said shaft and operatively associated with the second power transmission.

3. The combination of a base having a column with a headstock at its upper end and a spindle journalled in the headstock, a feed shaft mounted in the lower end of the base in substantially parallel relation to the spindle, means for driving the spindle, a power transmission connecting the spindle and said feed shaft, a fixture mounted on the forward side of the base, a slide on said fixture movable toward and from the axis of the spindle, a shaft to be driven mounted on said slide, and a second power transmission having one end operatively connected with said shaft to be driven and its other end operatively connected with said feed shaft, the operative connection between the second power transmission and the feed shaft including a pair of intermeshing gear elements mounted for relative movement into and out of driving relation.

4. A lathe having, in combination, a bed having carriage ways extending longitudinally thereof, a spindle mounted for rotation above the bed, a detachable fixture adapted to replace the usual tool carriage of the lathe having an upright portion adapted to be mounted on said ways and providing a horizontal table at its upper end, a slide mounted on said table for movement transversely above the bed, means for rotatably supporting a piece of work on the slide, means for supporting a milling cutter for rotation by said spindle, a feed shaft within the bed connected with a source of power, means for driving the work supporting means on the slide including a power transmission carried by the slide and a housing therefor at one end of the slide, and means operatively connecting said power transmission with the feed shaft adapted to permit transverse movement of the slide.

5. In a machine tool, the combination of a pair of milling cutters mounted for rotation on a fixed axis, a stationary fixture providing a horizontal table below said axis, a slide on said table providing a pair of spaced axially alined centers between which to support a piece of work for rotation, a member arranged to encircle the work between its ends and having a driving connection therewith, said member being mounted for rotation on said slide, means for moving the slide to carry the opposite ends of the work into engagement with said cutters, and means for rotating the work adapted to permit of its movement relative to the cutters.

6. In a machine tool, the combination of a pair of milling cutters mounted for rotation on a fixed axis, a stationary fixture providing a horizontal table below said axis, a slide on said table providing a pair of spaced axially alined centers between which to support a piece of work for rotation, a member arranged to encircle the work between its ends and having a driving connection therewith, said member being mounted for rotation on said slide, means for moving the slide to carry the opposite ends of the work into engagement with said cutters, and means for rotating the work adapted to permit of its movement relative to the cutters, said slide having thereon a housing in which said work-driving member is mounted for rotation, and the driving means for said member including a shaft having a gearing connection with said member.

7. In a machine tool, the combination of means for rotatably supporting a milling cutter, a support providing a table having its upper surface horizontally disposed below the axis of the cutter, a slide mounted on said table for movement transversely relative to the cutter, means for rotatably supporting a piece of work on the slide, means for moving the slide transversely, including a bell-crank lever pivoted upon the under side of said table, said slide having a groove therein parallel with the axis of the cutter, a roller on one arm of said lever arranged to operate in said groove and a handle rigid with the other arm of said lever.

8. In a machine tool, the combination of a bed, a spindle mounted to rotate above the bed, a cutter arbor fixed to said spindle, a support mounted on the forward side of the bed and providing a horizontal table projecting over the bed, and a bearing on the table for said arbor.

9. A milling attachment for machine tools comprising a support adapted to be mounted on the forward side of the machine base in place of the usual tool carriage and providing a table arranged to project over the base, a slide mounted on the table for transverse movement, a rotatable work holder on the slide and a driving connection for the work holder carried by said slide and operatively connected with a source of power normally utilized for operating the said lathe carriage, said table having a bearing at its rear end for supporting a cutter arbor.

In testimony whereof, I have hereunto affixed my signature.

GUSTAF DAVID SUNDSTRAND.